Sept. 15, 1925.

F. M. EASTON 1,553,601

SAWING MACHINE

Filed Dec. 27, 1923

Witness:
W. Hall

Inventor
Fred M. Easton
By Hazard and Miller
Attorneys

Patented Sept. 15, 1925.

1,553,601

UNITED STATES PATENT OFFICE.

FRED M. EASTON, OF POMONA, CALIFORNIA, ASSIGNOR, BY MESNE ASSIGNMENTS, TO MONARCH ELECTRIC SAW COMPANY, OF SAN FRANCISCO, CALIFORNIA.

SAWING MACHINE.

Application filed December 27, 1923. Serial No. 682,891.

*To all whom it may concern:*

Be it known that I, FRED M. EASTON, a citizen of the United States, residing at Pomona, in the county of Los Angeles and State of California, have invented new and useful Improvements in Sawing Machines, of which the following is a specification.

This invention relates to power driven sawing machines which are especially adapted for sawing bones that are encountered while making various cuts of meat.

The object of the invention is to provide a sawing machine in which a saw and operating mechanism is supported in such a manner that the saw may not only be moved forward or backward but also raised or lowered.

Another object is to provide a sawing machine in which a circular saw and electric motor are mounted on a structure which is pivoted to a movable supporting means at a point that the structure will normally assume an upright position (by the weight of the motor) when not in use and having a switch controlling the motor that will be automatically closed when the structure supporting the saw and motor is moved from the normal upright position to an approximately horizontal operating position.

Another object is to provide a sawing machine that may be controlled by one operative.

Other objects and advantages will appear from the following disclosure of a practical embodiment of the invention clearly set forth by the following description of the accompanying drawings and the novel feature thereof being pointed out in the appended claim.

Fig. 4 is a section taken on line 4—4 of Fig. 1.

Figure 1:
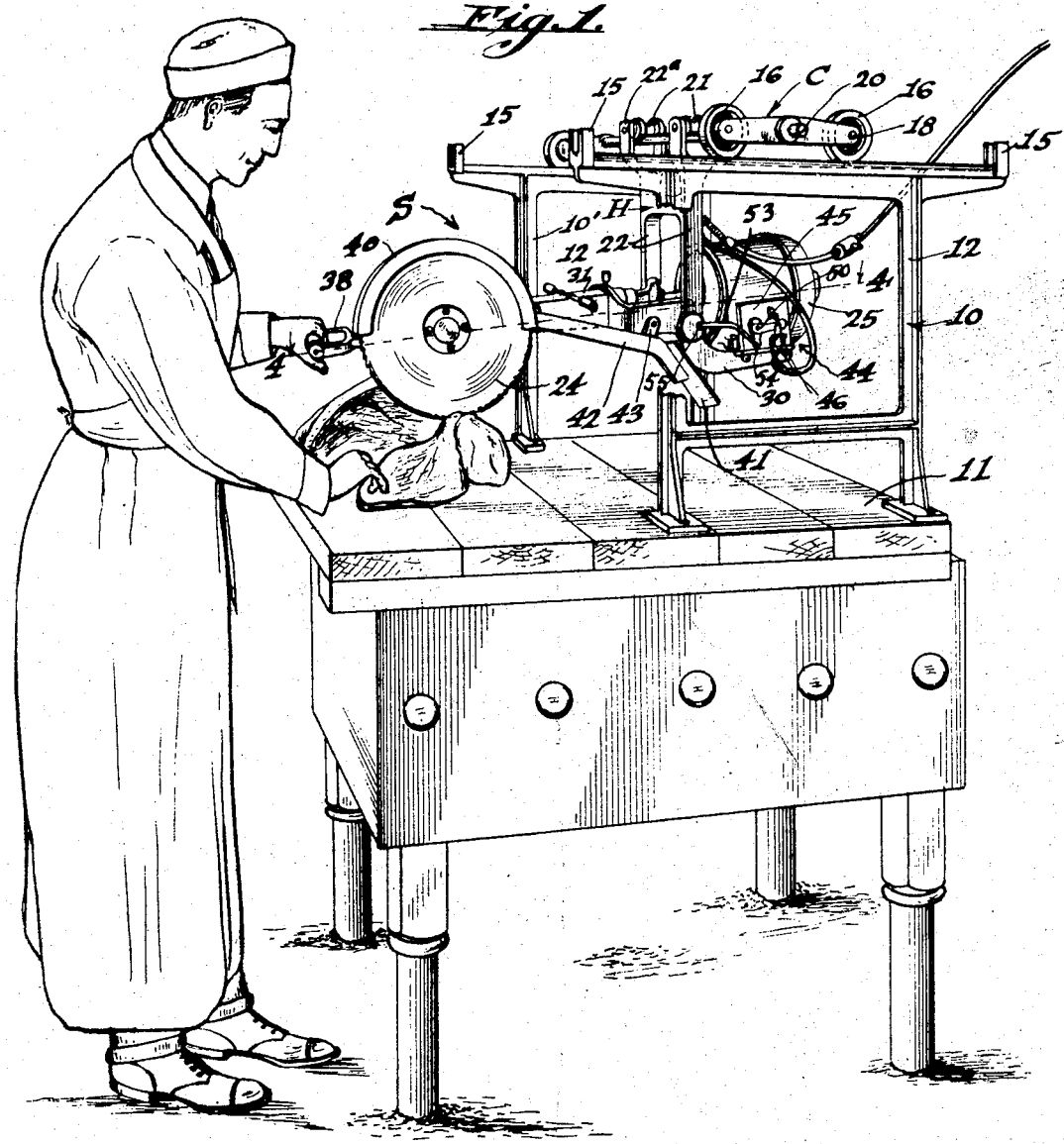
Fig. 1 is a perspective view of the sawing machine as it appears when being used for sawing bones.
Figure 2:
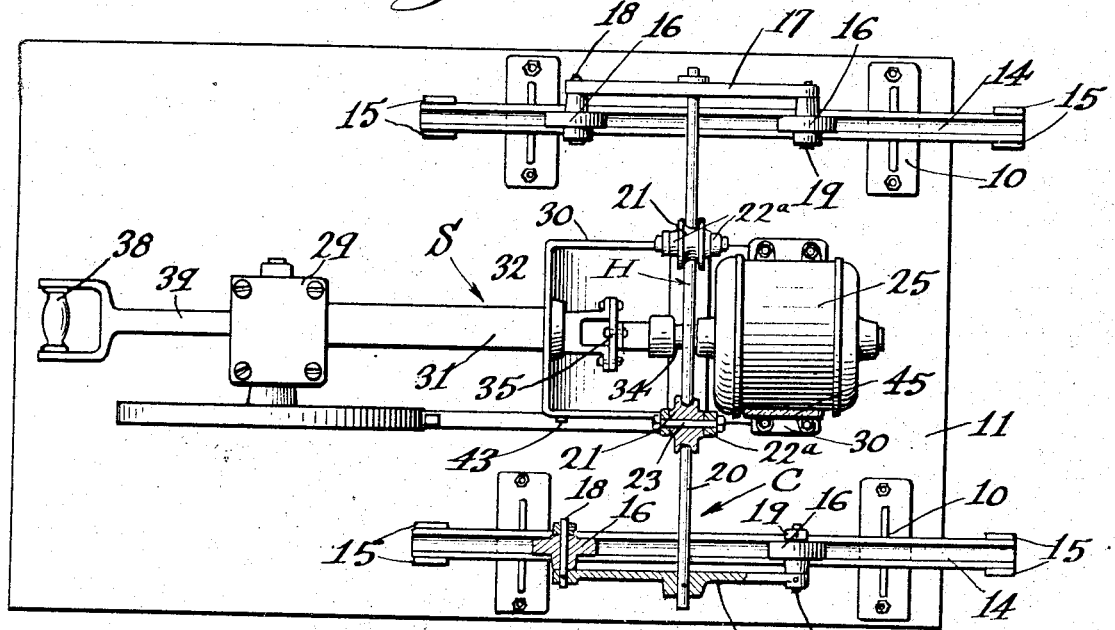
Fig. 2 is a plan view of the sawing machine parts being shown in section.

Referring by numeral to the accompanying drawings 10 and 10' designate upright frames mounted in parallel relation and fastened to a chopping block or base 11. The frames are preferably made of cast metal and consist of standards 12 supporting tracks or channels 14 having abutments 15 on each end for limiting the movement of a carriage generally designated at C mounted on the tracks 14. The carriage C consists of pairs of rollers 16 mounted on pins 18 connected to plates 17 and held by set collars 19.

The plates 17 are connected by a shaft 20 which is utilized for supporting a hanger generally designated at H movable on the shaft 20 by rollers 21 mounted in bifurcated ends 22ª of arms 22 by pins or bolts 23.

A circular saw 24 and electric motor 25 are mounted on a structure generally designated at S which is pivotally connected by pins 26 to the arms 22 of the hanger H. The saw is secured in any suitable manner to a shaft 27 mounted in bearings 28 of a gear box 29 while the motor 25 is mounted on a support 30 connected to the gear box by an elongated portion 31 having bearings 32 for supporting a shaft 33 one end of which is connected to the motor shaft 34 by a flexible joint 35 while the other end is provided with a bevel gear 36 fixed thereto, meshing with another bevel gear 37 secured to the saw shaft.

A handle 38 is utilized for moving the saw and motor structure and is connected to the gear box 29 by an arm 39.

A dust guard 40 surrounds the upper periphery of the saw for preventing dust being thrown on the operator while the saw is in rotation, while another dust guard 41 is provided for protecting the motor, each guard being connected to an arm 42 which is fastened to the motor supporting portion 31 of the structure S by a clip 43.

A switch generally designated at 44 is mounted on an insulated plate 45 fastened to the motor 25. The switch is provided with contacts 46 to which are connected to conductors 47 leading to and from a source of current not shown.

A quadrant 50 is pivoted to the plate 45. A link 53 is pivotally connected to the quadrant 50 and also pivoted at 55 to one of the arms 22.

Figure 3:
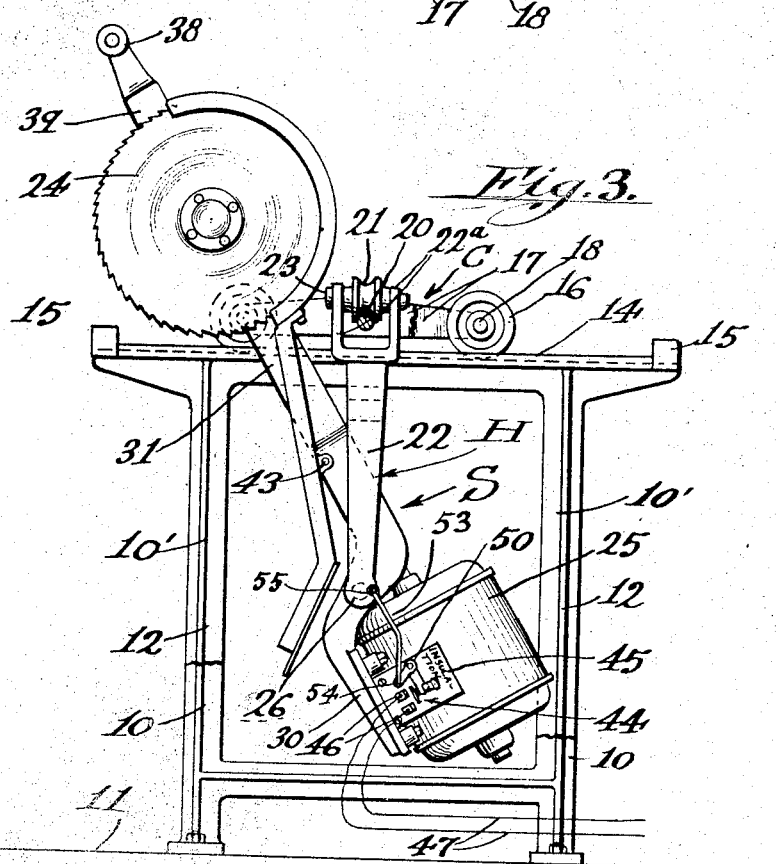
Fig. 3 is a side elevation of the sawing machine showing the sawing elements as they appear when not in use, parts being broken and shown in section.

It will be seen that the sawing structure normally assumes an upright position during which time the switch is open as shown in Fig. 3.

When it is desired to use the saw the operator first moves the saw downward by the handle 38, then optionally forward, backward or laterally in definite planes without stoppage therebetween to a position that it may engage a bone or other element which may then be severed as the saw will then be rotating by reason of the closing of the switch 44. The switch 44 is opened and closed by the link 53 in its pivotal connection to the quadrant 50, upon movement of the power unit provided by the saw motor and their transmission means, in its pivotal mounting 26, in the hanger H.

From the construction it will be seen that the saw is capable of a wide range of cutting positions provided by the forward and backward movement of the carriage on the tracks of the frames and the lateral movement of the hanger on the shaft of the carriage together with the arcuate movement of the saw and motor structure.

The rollers of the hanger having concave faces engaging the shaft of the carriage will allow additional forward, backward and arcuate movement of the pivoted saw and motor supporting structure after the rollers of the carriage have engaged the abutments at either end of the tracks of the frames.

Further embodiments, modifications and variations may be resorted to within the principle of the invention.

What is claimed is:

In a sawing machine an electric motor, saw and transmission means therebetween providing a power unit, a holder for said unit mounted to move in fixed planes in the provision of a universally movable carrier therefor, an electric switch connected to the motor, means for pivotally mounting said power unit in said holder, means for releasably confining said unit and opening said switch by overbalancing the motor end of said unit in its pivotal mounting and means whereby upon movement of said unit from its releasably confined position said switch is closed for the passage of current to the motor.

In testimony whereof I have signed my name to this specification.

FRED M. EASTON.